Nov. 2, 1954     M. C. TOWNS, JR     2,693,111

FUEL OR PROPELLANT GAUGE

Filed April 30, 1952

INVENTOR

MIRABEAU C. TOWNS JR.

BY *William R. Wright, Jr.*

AGENT

United States Patent Office 2,693,111
Patented Nov. 2, 1954

2,693,111

FUEL OR PROPELLANT GAUGE

Mirabeau C. Towns, Jr., Morristown, N. J., assignor to Reaction Motors, Inc., Rockaway, N. J., a corporation of New Jersey Application April 30, 1952, Serial No. 285,104

5 Claims. (Cl. 73—297)

The present invention relates to a gauge for determining the quantity of liquid contained within a supply tank. It relates more particularly to a gauging device for determining the amount of liquid remaining in a tank which is being rotated.

In a co-pending application of the present inventor bearing Serial Number 283,691, a tank is shown fixedly mounted upon the central hub of the rotor of a rotary wing aircraft in such a manner that the tank is rotated with the rotor. With such an arrangement, it has been found that the liquid contained within the tank is acted upon by centrifugal force and thus its liquid level will not be parallel to the ground as would be the case in a static tank or container under ordinary conditions, nor parallel to the bottom of the tank as for instance in a conventional aircraft tank.

Instead, in the case of a rotating tank, the liquid level will be a segment of a paraboloid, the segment being tilted to slant upward from the bottom of the tank in the manner shown in the drawings included as a part of this specification. It is apparent then that ordinary fuel gauges of the float or hydrostatic type will not function properly under conditions where the tank is rotated because of the centrifugal force loading and the tilted liquid level.

In the present invention, however, this centrifugal effect is utilized to help operate the gauge as well as to force the liquid fuel or propellant from the tank. Furthermore, the effect of a tilted liquid level is minimized by the location of the gauge's flow sensing devices.

The present invention senses the distance of the liquid level from the outlet of the tank, which is accomplished in steps ranging from full to empty in equal increments such as ¾, ½, and ¼ or smaller as desired.

It is, therefore, an object of the present invention to provide a combined content gauge and liquid distribution apparatus for a rotary tank for liquid fuel or other propellant which will distribute or deliver the liquid and at the same time give an accurate indication of the quantity of liquid remaining therein as the tank is rotated.

It is also an object of the present invention to provide a contents gauge of the foregoing type which is lightweight, easily constructed, and simple and dependable in operation.

It is another object of the present invention to provide a contents gauge of the foregoing type, the accuracy of which is relatively unaffected by changes in the speed of rotation of the tank.

Other objects and advantages of the present invention will be apparent from the general and detailed description which follows.

Figure 1:
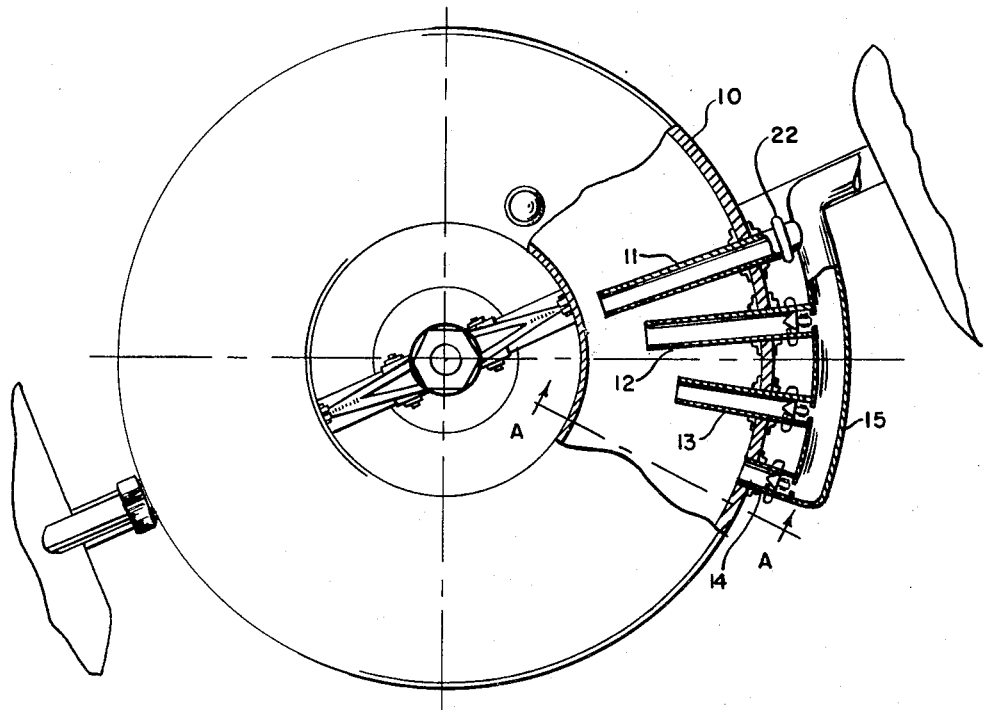
Figure 1 is a cutaway plan view showing the gauge installed in a rotary tank.

In Figure 1 an embodiment of the present invention is shown. A tank 10 is mounted to be rotated by attachment to a rotor of a rotary wing aircraft for the purpose of feeding and storing propellant for reaction motors located in or on the rotor blades. From this figure, it will be seen that liquid within the tank will be forced toward the outer edge of the tank by centrifugal force and will assume a liquid level having a slope dependent upon the speed of rotation of the tank and upon the radius from the axis of rotation to the liquid level. Since the diameter of the tank is fixed, the slope of the liquid level will change principally with the speed of rotation as indicated by the dotted lines in Figure 2. The slope brought about by a decrease in rotational speed is shown by a dotted line and the slope brought about by an increase in the speed of rotation is shown by a broken line. From this it can be seen that the approximate midpoint of the liquid level remains substantially at a constant distance from the tank outlet for a constant quantity of liquid regardless of changes in the speed of rotation which would cause tilting of the level to the extent indicated. In view of the foregoing, the present invention has been arranged to take advantage of this effect in the determination of the contents of the tank during its rotation.

Figure 2:
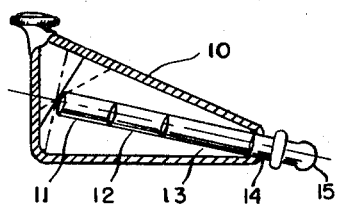
Figure 2 is a cross-sectional view of a rotary tank showing the installation of the gauge and the slope of the liquid level for various speeds of rotation.

In Figure 1, pipes or open-ended conduits 11, 12, 13 and 14 are fastened into tank 10 at its outer edge in the manner shown and extend radially into the tank in substantial alignment with the median line of the outer base angle of the tank and with radii of rotation as shown in the drawings. In this way, it is assured that the end of each conduit within the tank will be at a location where changes in the speed of rotation will have little effect upon the liquid level directly above the opening of the tube as discussed in the previous paragraph and as shown in Figure 2. Each conduit is of a different length and is open-ended, i. e. has an opening at or near its end, to admit liquid to its hollow interior. Due to the action of centrifugal force, liquid will be caused to flow through this opening into and through each tube into a collector or collecting manifold 15 located outside the tank. In each conduit is a cessation of flow detector of the type shown in Figure 3 by means of which a flow of liquid through the individual pipes is detected. Since the pipes are of different lengths, or at least have their inlet openings at different distances from their outlets, liquid will cease flowing through the longest conduit first as the liquid contents of the tank decreases, and then will cease flowing through each of the shorter pipes in turn as the liquid contents of the tank decrease still more. The inlet openings of the pipes can be made at the proper distances from the pipe outlets to indicate accurately the quantity of liquid remaining in the tank as the flow ceases through each successive pipe, the size of the increments depending upon the number of conduits employed. An electrical circuit is provided to each of the cessation of flow indicators to transmit the electrical indication of cessation of flow to a remote location in view of the operator of the aircraft or other vehicle to which the gauge may be attached.

From collector manifold 15, the liquid is carried directly by suitable piping to the reaction motors located in or on the rotor blades to supply them with the liquid fuel or propellant. The gauge may, however, if such usage is desirable be used with other liquids such as de-icing fluids or other liquids not intended as fuels or propellants.

Figure 3:
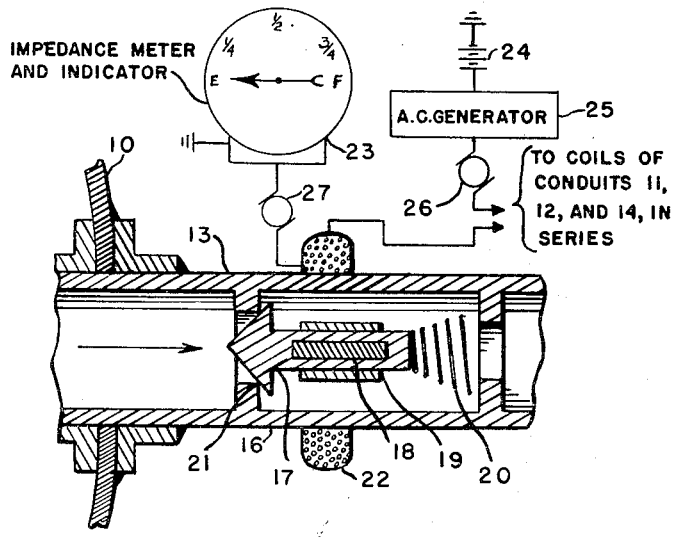
Figure 3 is a cross-sectional view of the flow detector within one of the conduits, and a diagrammatic view of the electrical system.

Figure 3 is a detailed view of one of the flow detectors showing its internal parts and the manner in which the cessation of flow signal is transmitted from within the tube to an electrical circuit utilized to carry the signal to a remotely located indicator dial 23. The detector comprises a body portion 16, a solid valve poppet or movable member 17, a core piece 18 of magnetic material, a poppet guide 19, a helical compression spring 20, a valve seat 21, and an external coil 22. As liquid passes through the conduit, valve poppet 17 is held off its seat 21 by the force of the liquid flow, spring 20 being compressed. As the flow of liquid ceases, poppet 17 will be urged against its seat 21 by the now unresisted spring. Magnetic core piece 18 thus is moved to the left in Figure 3 by the cessation of liquid flow and passes into the field of coil 22 thereby changing the impedance of the electrical system to which it is attached. This change in impedance is then detected by impedance meter 23 and is indicated on its dial which is calibrated in quantity of liquid remaining in the tank. As each cessation of flow detector operates, the impedance of the electrical circuit will change, and the indication in discrete steps of the contents of the tank will show on the dial.

The electrical circuit includes grounded battery 24, preferably of 24 volts, an alternating current generator 25, slip rings 26 and 27, coils 22 on each of conduits 11, 12, 13 and 14, and impedance meter and indicator 23. In operation, current flows from grounded battery 24 to alternating current generator 25 where the current is changed to alternating current. From this point, the alternating current passes through slip rings 26 from the relatively stationary portion of the vehicle to the rotary portion upon which the gauge is mounted.

While there have been shown and described and pointed out the fundamental novel features of this invention as applied to a single modification, it will be understood that various ommissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A combined contents gauge and liquid distribution apparatus for a liquid supply tank comprising a plurality of open-ended conduits extended into said tank to various extents through the liquid toward the liquid level, a collector manifold external of said tank and communicating with said conduits, and a cessation of flow detector in each conduit comprising a movable solid poppet, a core of magnetic material within said poppet, an electrical coil about the exterior of said conduit and poppet carrying an alternating electric current, and a spring behind said poppet downstream of said poppet, whereby upon cessation of liquid flow in the said conduit said poppet and magnetic core piece are moved into the field of said coil to increase the impedance thereof.

2. The invention set forth in claim 1 with the electrical coils about the conduits connected in series with one another and with an impedance indicator, whereby indications of the said impedance indicator will show the approximate contents of the tank.

3. In combination with a rotary supply tank for liquids, a combined contents gauge and liquid collector comprising a manifold attached to the outer periphery of the tank, at least one reaction motor communicably connected to said manifold, a plurality of conduits communicably attached to said manifold and extended into said tank to different extents, said conduits being open at their ends within the tank, and means for detecting cessation of liquid flow through each of the said conduits, whereby the level of the liquid contents of the tank is indicated in steps as the liquid leaves the tank.

4. The invention set forth in claim 3 with the conduits extended into the tank to different extents in substantial alignment with radii of rotation of the tank but less than one radius in length within the tank.

5. In combination with a rotary supply tank for liquids, a combined contents gauge and liquid collector comprising a manifold attached to the outer periphery of the tank, at least one reaction motor communicably connected to said manifold, a plurality of conduits communicably attached to said manifold and extended into said tank to different extents in substantial alignment with radii of rotation of the tank but less than one radius in length within the tank, cessation of flow detectors in each conduit, and a remotely-located indicator for indicating cessation of liquid flow through each conduit.

References Cited in the file of this patent

UNITED STATES PATENTS

| Number | Name | Date |
|---|---|---|
| 368,441 | Baker | Aug. 16, 1887 |
| 911,786 | Vaughn | Feb. 9, 1909 |
| 1,917,974 | Inglis | July 11, 1933 |
| 2,153,213 | Thomas | Apr. 4, 1939 |
| 2,420,539 | Hornfleck | May 13, 1947 |
| 2,552,552 | Head | May 15, 1951 |

FOREIGN PATENTS

| Number | Country | Date |
|---|---|---|
| 429,327 | Germany | May 6, 1923 |
| 352,645 | Great Britain | July 16, 1931 |